(12) United States Patent
Kelly

(10) Patent No.: US 6,750,430 B2
(45) Date of Patent: Jun. 15, 2004

(54) NICKEL-BASE POWDER-CORED ARTICLE, AND METHODS FOR ITS PREPARATION AND USE

(75) Inventor: Thomas Joseph Kelly, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/280,393

(22) Filed: Oct. 25, 2002

(65) Prior Publication Data

US 2004/0079742 A1 Apr. 29, 2004

(51) Int. Cl.[7] ............................................. B23K 35/34
(52) U.S. Cl. ........................... 219/146.41; 219/146.32; 219/146.31
(58) Field of Search ...................... 219/146.41, 146.32, 219/146.31, 146.23, 146.1, 145.1

(56) References Cited

U.S. PATENT DOCUMENTS

| | | |
|---|---|---|
| 2,785,285 A | 3/1957 | Bernard |
| 3,418,446 A | 12/1968 | Claussen |
| 3,513,287 A | 5/1970 | Arnoldy |
| 3,834,002 A | 9/1974 | Sissons et al. |
| 4,324,588 A * | 4/1982 | Zysk et al. ............... 75/208 R |
| 4,331,857 A | 5/1982 | Crisei et al. |
| 4,578,114 A * | 3/1986 | Rangaswamy et al. ....... 75/252 |
| 4,624,706 A | 11/1986 | Badia |
| 4,725,508 A * | 2/1988 | Rangaswamy et al. ....... 48/570 |
| 4,741,974 A * | 5/1988 | Longo et al. ............... 428/558 |
| 4,777,710 A | 10/1988 | Hunt |

* cited by examiner

Primary Examiner—M. Alexandra Elve
(74) Attorney, Agent, or Firm—Carmen Santa Maria; Kurt L. Ehresman; McNees Wallace & Nurick LL

(57) ABSTRACT

An article is made by preparing an elongated preform having a net metallic composition, and including a tubular sheath made of a sheath nickel-base alloy, and a core disposed within the tubular sheath and including consolidated powder particles made of a core nickel-base alloy. The net metallic composition is preferably a nickel-base superalloy, and most preferably a high-gamma-prime nickel-base superalloy. The preform is wire drawn to a final maximum transverse size that is less than the initial maximum transverse size, to produce a drawn article. The drawn article may be used as a weld filler material.

22 Claims, 2 Drawing Sheets

NICKEL-BASE POWDER-CORED ARTICLE, AND METHODS FOR ITS PREPARATION AND USE

This invention relates to an article formed of a tubular sheath filled with powder and, more particularly, to a welding filler metal having a net metallic composition of a high-gamma-prime nickel-base superalloy.

BACKGROUND OF THE INVENTION

In a form of welding, a metallic article to be welded is locally melted, and the melted metal is mixed with a second metal. The temperature is thereafter reduced so that the melted material solidifies. In one approach, the second metal is another article, so that the two articles are joined together. In another approach, the second metal is an overlay deposit that is also melted during the welding process, with the result that the first article is overlaid with the second metal.

A filler metal may be used in either of these approaches. In the joining of two articles by welding, the filler metal may be added into the melted zone to fill the space between the two articles. In the overlay process, the filler metal may form substantially the entire overlay. The filler metal may be the same as one or both of the articles being joined in the first approach. In the second approach, the filler metal may be the same as the article being overlaid, such as when the dimensions of the article are being restored during a repair process, or of a different composition to provide particular properties to the surface of the overlaid article.

The filler metal is often supplied as a weld wire that is used in automated welding apparatus and other welding procedures. (As used herein, "wire" and "weld wire" include physical forms that are considered rods and also physical forms that are considered wires, avoiding the need for any arbitrarily selected distinction as to whether the physical form is a rod or a wire.) A heat source, such as an electrical welding power supply or a beam source such as a laser or electron beam, heats the region of the article to be melted, forming a molten pool. The weld-wire filler metal is gradually fed into the molten pool to supply the desired volume of the filler metal.

The welding filler metal may be produced in weld-wire form in various ways. In one approach, it is cast as a billet and then extruded or wire drawn to smaller transverse size. In another approach, it is consolidated as a powder into a billet, and then extruded or wire drawn to smaller transverse size. In either of these fabrication techniques, the extruded article is centerless ground to achieve the desired shape and size, and to remove the remnants of the extrusion operation.

Some alloys of interest as filler metals in welding applications, notably nickel-base alloys such as nickel-base superalloys with a high volume fraction of gamma prime phase when heat treated, cannot be wire drawn due to their work hardening properties and limited ductilities. The welding filler metal weld wire is therefore produced by a specialized extrusion process, followed by acid etching and centerless grinding of the extruded material. As a result, the manufacturing yields of usable weld wire are low, typically about 25 percent of the weight of the starting material. The process is also relatively expensive. The cost of the weld wire is therefore high, relative to the material cost.

There is a need for an improved approach to the fabrication of weld wire and related types of products made of difficult-to-draw nickel-base alloys such as high-gamma-prime nickel-base superalloys. The present invention fulfills this need, and further provides related advantages.

SUMMARY OF THE INVENTION

The present approach provides a powder-cored article that is useful as the filler metal in welding. The article has a nickel-based net metallic composition according to the compositions and relative amounts of its components. When used as a welding wire, the powder-cored article used in the same manner as conventional weld wire, and is melted into the molten weld pool to provide the desired net metallic composition. The powder-cored article is relatively inexpensive to manufacture, with a high yield of finished material. With the present approach, there is essentially a 100 percent yield of the usable weld wire, as compared with the weight of the starting material. The cost of the final product is less than the cost of the welding wire of the same net composition prepared by the conventional extrusion approach.

In accordance with the invention, an article has a net metallic composition and comprises a tubular sheath made of a sheath nickel-base alloy, and a core disposed within the tubular sheath and comprising powder particles made of a core nickel-base alloy. Initially, the powder particles are packed relatively loosely, but during processing they are compacted so that they have substantially no voids therebetween. Preferably, the ratio of the weight of the core nickel-base alloy to the weight of the total of the core nickel-base alloy plus the sheath nickel-base alloy is not greater than about 0.3.

Preferably, the sheath nickel-base alloy has no more than about 4 percent of aluminum by weight, and the core nickel-base alloy has more than about 4 percent of aluminum by weight. In one embodiment, the sheath nickel-base alloy has from 0 to about 4 percent by weight aluminum, and the core nickel-base alloy has from about 10 to about 15 percent by weight aluminum. The sheath nickel-base alloy has a sheath-nickel-base-alloy liquidus temperature and the core-nickel-base alloy has a core-nickel-base-alloy liquidus temperature. It is preferred that the sheath-nickel-base-alloy liquidus temperature and the core-nickel-base alloy liquidus temperature are sufficiently close that they melt substantially simultaneously, which is typically achieved if they are within about 200° F. of each other. It is also preferred that the sheath-nickel-base-alloy liquidus temperature is less than the core-nickel-base-alloy liquidus temperature.

The net metallic composition of the article is desirably a nickel-base superalloy hardenable by the precipitation of gamma prime or a related phase. More preferably, the net composition of the article is desirably a high-gamma-prime nickel-base superalloy having more than about 30 volume percent gamma prime phase upon heat treatment. In a preferred embodiment, the sheath nickel-base alloy has a composition in weight percent of about 12 percent cobalt, about 1.5 percent molybdenum, about 4 percent tungsten, about 3.5 percent aluminum, about 4 percent tantalum, about 3.75 percent rhenium, about 8 percent chromium, about 2 percent hafnium, about 0.004 percent boron, about 0.002 percent carbon, balance nickel and minor elements, and the core nickel-base alloy has a composition in weight percent of about 12 percent cobalt, 1.5 percent molybdenum, about 7.6 percent tungsten, about 14.2 percent aluminum, about 13.5 percent tantalum, about 8 percent chromium, about 0.04 percent yttrium, about 0.05 percent boron, about 0.41 percent carbon, balance nickel and minor elements.

The core may also include nonmetallic particles, such as nonmetallic reinforcement particles or fibers, mixed with the metallic powder. Examples include oxide particles. The nonmetallic particles are not melted during any welding operation. The composition of the nonmetallic particles, if any, is not included in the compositional calculations of the net metallic composition.

A method of making an article comprises the steps of preparing a preform having a net metallic composition and comprising a tubular sheath made of a sheath nickel-base alloy, and a core disposed within the tubular sheath and comprising consolidated powder particles made of a core nickel-base alloy. The preform is wire drawn to produce a drawn article. The drawn article may be of any diameter, but is typically less than about 0.125 inches in outside diameter. The drawn article is preferably used as a weld filler material, as by melting the drawn article to form a melted article during the welding operation. Compatible features discussed elsewhere herein may be used in conjunction with the method.

When the present approach is used in its preferred application of making a nickel-base superalloy weld wire, care is taken to allocate the aluminum between the sheath and the core. Nickel-base superalloys typically have from about 3 to about 8 percent by weight aluminum. The sheath nickel-base alloy has no more than about 4 percent of aluminum by weight, with the balance of the aluminum provided by the core nickel-base alloy. If the sheath nickel-base alloy has more than about 4 percent of aluminum by weight, it is difficult or impossible to reduce the article by wire drawing due to the work hardening characteristics of the sheath nickel-base alloy. Thus, by placing the higher aluminum content into the powdered core and having a relatively lower aluminum content in the sheath, the combination can be wire drawn yet still have the desired nickel-base superalloy net composition.

The result of using this approach is that the cost of the welding wire is substantially reduced. When articles such as high-gamma-prime nickel-base superalloy welding wire are produced by extrusion, a cast rod of the final desired composition is enclosed in an extrusion can, the extrusion can with its enclosed rod is extruded, the can material is chemically etched away, and the remaining extruded material is centerless ground to the desired size. There is a low yield of usable welding wire, typically in the range of about 25 percent of the weight of the starting material, achieved with high production costs.

With the present approach, care is taken so that the liquidus temperatures of the sheath and the core materials are relatively close together, with the sheath-nickel-base-alloy liquidus temperature preferably slightly lower than the core-nickel-base-alloy liquidus temperature. The core and the sheath melt at about the same temperature and time, but with the sheath melting slightly before the core.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
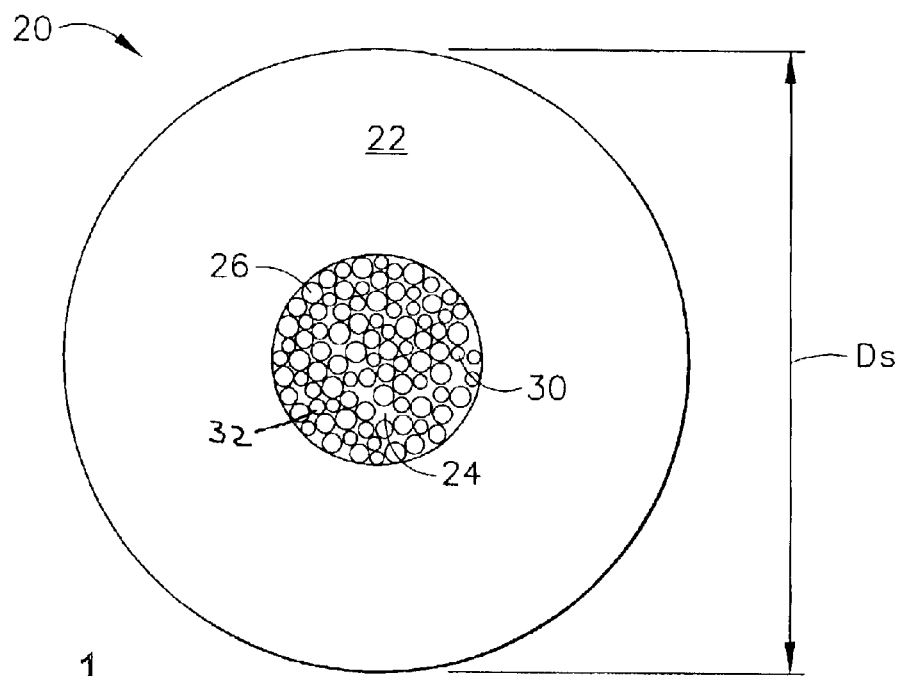
FIG. 1 is a transverse schematic sectional view of an article of the present approach.
Figure 2:
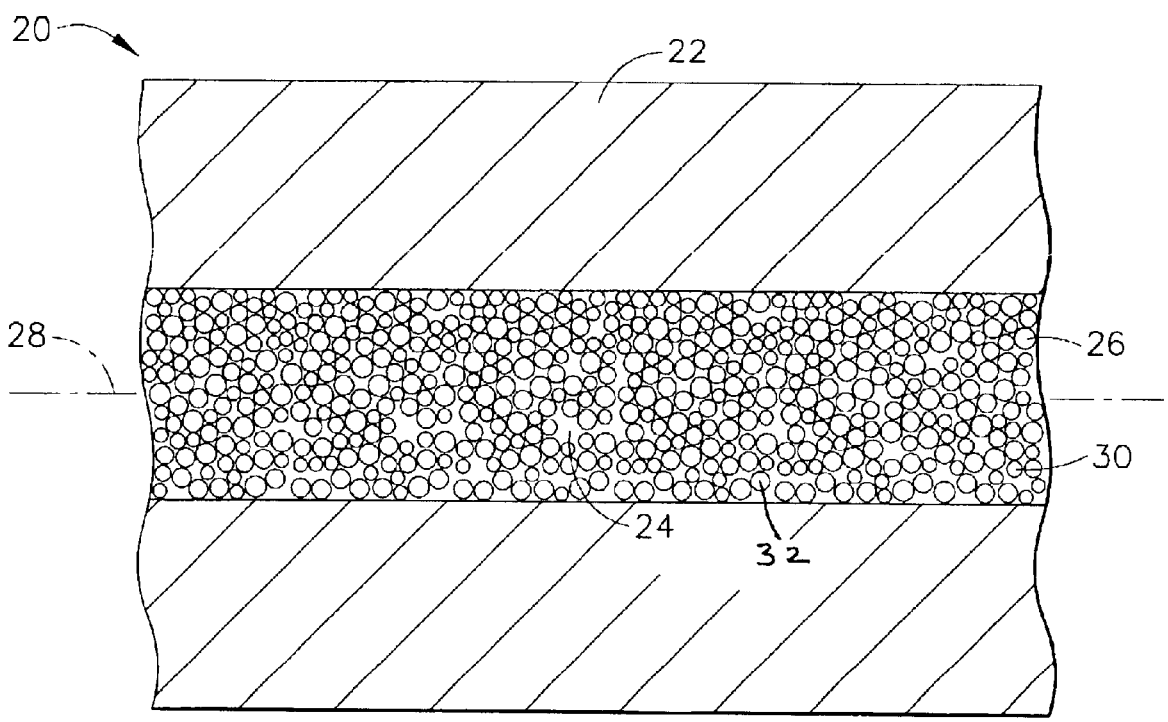
FIG. 2 is a longitudinal schematic sectional view of the article of FIG. 1.

FIGS. 1–2 depict an article 20 having a net metallic composition. The article includes a tubular sheath 22, and a core 24 comprising powder particles 26 disposed within the tubular sheath 22. The sheath 22 has an outer diameter $D_s$. The outer diameter $D_s$ may be of any operable value. In the preferred fabrication approach discussed below in conjunction with FIG. 3, $D_s$ is initially relatively large, and is reduced during the wire drawing procedure. In a typical case, $D_s$ is initially from about 0.25 to about 0.3 inch, and in the final article 20 used as a weld wire $D_s$ is from about 0.045 to about 0.125 inch. The powder particles 26 may initially be of any operable size. The article 20 is preferably elongated along an axis 28 seen in FIG. 2, and is typically in the form of an elongated wire (a term which, as used herein, includes physical forms generally thought of as wire and physical forms generally thought of as rod). The article 20 is preferably circular in cross section as illustrated in FIG. 1, so that the article 20 is cylindrically symmetric about the axis 28.

The sheath 22 is made of a sheath nickel-base alloy and the core 24 is made of a core nickel-base alloy. The powder particles 26 that make up the core 24 may all be of the same composition, or they may be of different compositions that taken together have the composition of the core nickel-base alloy. The core 24 may additionally and optionally include nonmetallic particles 30. In the welding wire application of the article 20, the nonmetallic particles 30, where present, may be powders or fibers that serve as reinforcements in the final weld. The nonmetallic particles 30 do not melt, and their compositions are not included in the net metallic composition of the article 20. A flux material 32 may optionally be placed within the core 24, and its composition is also not included in the net metallic composition of the article 20.

The net metallic composition of the article 20 is the weight fraction of the sheath 22 times the composition of the sheath nickel-base alloy, plus the weight fraction of the core 24 times the composition of the core nickel-base alloy. The weight fraction of the sheath 22 is the weight of the sheath 22 divided by the total weight of the sheath 22 plus the metallic portion of the core 24 (not including any nonmetallic particles 30 and flux material 32), and the weight fraction of the core 24 is the weight of the core 24 (not including any nonmetallic particles 30) divided by the total weight of the sheath 22 plus the metallic portion of the core 24 (not including any nonmetallic particles 30 and flux material 32). Preferably but not necessarily, the ratio of the weight of the core nickel-base alloy to the weight of the total of the core nickel-base alloy plus the sheath nickel-base alloy (i.e., the weight fraction of the core 24) is not greater than about 0.3, and is preferably in the range of from about 0.2 to about 0.3.

The net metallic composition is a nickel-base alloy. A nickel-base alloy has more nickel than any other element. The net metallic composition is preferably a nickel-base superalloy. A nickel-base superalloy is a nickel-base alloy that is hardenable by the precipitation of gamma prima phase, $Ni_3Al$, or a related phase. A high-gamma-prime nickel-base superalloy has more than about 30 volume percent of gamma prime phase after heat treating to form the gamma prime phase. Preferably but not necessarily, the high-gamma-prime nickel-base superalloy has more than about 40 volume percent, and most preferably more than about 60 volume percent in the strongest of the high-gamma-prime nickel-base superalloys. Typical compositions for high-gammna-prime nickel-base superalloys are, in weight percent, from about 2 to about 20 percent cobalt, from about 1 to about 10 percent chromium, from about 3 to about 8 percent aluminum, from 0 to about 2 percent molybdenum, from about 3 to about 8 percent tungsten, from about 4 to about 12 percent tantalum, from 0 to about 5 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities, although in some instances the composition may lie outside these ranges. The sheath nickel-base alloy and the core nickel-base alloy are not necessarily (but may be) themselves nickel-base superalloys, but their net metallic composition produced upon melting and intermixing of the sheath 22 and the core 24 is a high-gamma-prime nickel-base superalloy in the most preferred embodiment.

The compositions of the sheath 22 and the core 24 are not arbitrarily selected in the preferred embodiment wherein the net metallic composition is a nickel-base superalloy and most preferably the high-gamma-prime nickel-base superalloy. A number of requirements must be met, and the compositions set forth herein achieve these several requirements. In this case, the sheath nickel-base alloy has no more than about 4 percent of aluminum by weight, and the core nickel-base alloy has more than about 4 percent of aluminum by weight, with the net metallic composition of aluminum of the article 20 being determined as discussed earlier. Most preferably, the sheath nickel-base alloy has from about 3 to about 4 percent by weight aluminum, and the core nickel-base alloy has from about 10 to about 15 percent by weight aluminum. The amount of aluminum in the sheath is of concern because higher aluminum contents cause the sheath to work harden rapidly and have limited ductility, so that it is not possible to wire draw the material. For this reason, it is not practical to make a welding wire of homogeneous composition of the nickel-base superalloy by drawing. With the present approach, on the other hand, the aluminum content of the sheath 22 is limited to a maximum level, preferably about 4 weight percent, at which the sheath 22 may be mechanically worked. The aluminum content of the sheath must be sufficient that the net composition of the weld wire is of the required composition, most preferably a high-gamma-prime nickel-base superalloy. With a typical weight fraction of the sheath being about 0.7–0.8 of the total weight of the weld wire, the sheath nickel-base alloy desirably has more than about 10 weight percent aluminum. The core nickel-base alloy must have sufficient aluminum so that the desired net aluminum composition is reached. However, if the aluminum content of the core nickel-base alloy is too high, the powder is likely to oxidize so that an undesirable oxide is melted into the weldment.

Another important consideration is the liquidus temperatures of the sheath nickel-base alloy and the core nickel-base alloy. The liquidus temperature is the temperature at which an alloy completely melts upon heating from a lower temperature. The sheath nickel-base alloy has a sheath-nickel-base-alloy liquidus temperature and the core-nickel-base alloy has a core-nickel-base-alloy liquidus temperature. Preferably, the sheath-nickel-base-alloy liquidus temperature is lower than the core-nickel-base-alloy liquidus temperature. The lower liquidus temperature of the sheath nickel-base alloy allows the sheath 22 to melt at a slightly lower temperature than the core 24, so that the weld wire melts from the outside toward the inside, and there is not a risk with the powder particles 26 melting and running out of the sheath 22. However, the sheath-nickel-base-alloy liquidus temperature and the core-nickel-base-alloy liquidus temperature are preferably sufficiently close together that the sheath 22 and the core 24 melt substantially at the same temperature and substantially simultaneously. It is preferred that the sheath-nickel-base-alloy liquidus temperature and the core-nickel-base-alloy liquidus temperature are within about 200° F., most preferably within about 125° F. of each other, to achieve this result. If there is a greater difference between the two liquidus temperatures, there is a risk that there will be unmelted metallic particles or pieces in the melt.

The liquidus temperatures of the sheath nickel-base alloy and the core nickel-base alloy are determined by the respective compositions of the sheath 22 and the core 24. Elements other than aluminum are therefore partitioned between the sheath 22 and the core 24 to achieve the desired liquidus temperatures and avoid too high a hardening rate in the sheath 22.

In a most preferred embodiment that is the subject of the initial development of the present approach, the net metallic composition is substantially that of Rene™ 142 high-gamma-prime nickel-base superalloy, which has a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements. To produce this net metallic composition, the sheath nickel-base alloy has a composition in weight percent of about 12 percent cobalt, about 1.5 percent molybdenum, about 4 percent tungsten, about 3.5 percent aluminum, about 4 percent tantalum, about 3.75 percent rhenium, about 8 percent chromium, about 2 percent hafnium, about 0.004 percent boron, about 0.002 percent carbon, balance nickel and minor elements; the core nickel-base alloy has a composition in weight percent of about 12 percent cobalt, 1.5 percent molybdenum, about 7.6 percent tungsten, about 14.2 percent aluminum, about 13.5 percent tantalum, about 8 percent chromium, about 0.04 percent yttrium, about 0.05 percent boron, about 0.41 percent carbon, balance nickel and minor elements. The weight fraction of the sheath 22 is preferably about 0.8, and the weight fraction of the core 24 is preferably about 0.2.

Figure 3:
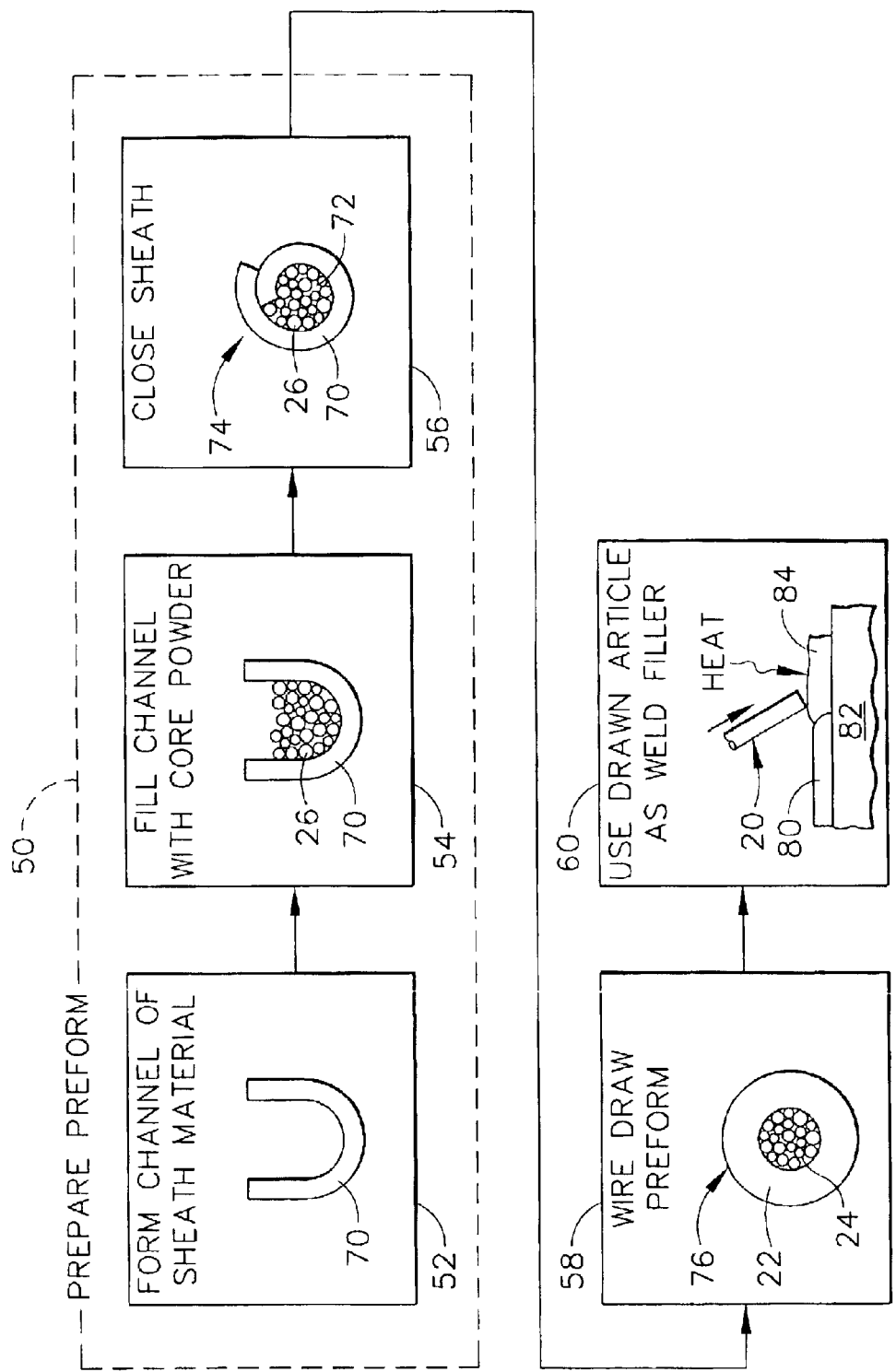
FIG. 3 is a diagrammatic block flow diagram of an approach for fabricating the article and using the article as a welding wire.

Some examples of other high-gamma-prime nickel-base superalloys that may be made in the form of the article 20 such as weld wire by the present approach include Rene® 80, having a nominal composition in weight percent of about 14.0 percent chromium, about 9.5 percent cobalt, about 4.0 percent molybdenum, about 4.0 percent tungsten, about 3.0 percent aluminum, about 5.0 percent titanium, about 0.17 percent carbon, about 0.015 percent boron, about 0.03 percent zirconium, balance nickel and minor elements; Rene® N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; Rene® 195, having a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and minor elements; Rene® 125, having a nominal composition in weight percent of about 10 percent cobalt, about 8.9 percent chromium, about 2 percent molybdenum, about 7 percent tungsten, about 3.8 percent tantalum, about 4.8 percent aluminum, about 1.55 percent hafnium, about 0.11 percent carbon, about 2.5 percent titanium, about 0.1 percent niobium, about 0.05 percent zirconium, about 0.015 percent boron, balance nickel and minor elements; and Rene® 108, having a nominal composition in weight percent of about 9.5 percent cobalt, about 8.35 percent chromium, about 0.5 percent molybdenum, about 9.5 percent tungsten, about 3 percent tantalum, about 0.75 percent titanium, about 5.5 percent aluminum, about 1.5 percent hafnium, about 0.09 percent carbon, about 0.015 percent boron, about 0.01 percent zirconium, balance nickel and minor elements FIG. 3 depicts a preferred approach for making the article 20. The method includes preparing a preform having the net metallic composition, step 50. In a preferred approach for preparing the preform, a strip of the sheath material is formed into a U-shaped channel 70, step 52. The channel 70 is the sheath material. The channel 70 is filled with the core powder particles 26, step 54. The compositions and relative weights of the sheath material of the channel 70 and the powder particles 26 are established as described earlier. Nonmetallic particles 30 and flux material 32, if used, are mixed with the powder particles 26 prior to step 54. The channel 70 is closed, step 56, by wrapping its sides the remainder of the way around the powder particles 26 so that the channel extends over about 450 degrees of circumference to make the generally cylindrical preform 74 in which the powder particles 26 are contained within the closed channel. The preform 74 usually has an initial maximum transverse dimension less than its longitudinal length.

The preform 74 is wire drawn from the initial size to the desired size $D_s$, numeral 58, to produce a drawn article 76. The drawn article 76 may be the same as the final article 20 of FIGS. 1–2, but there may be other operations such as cleaning performed after step 58 and before the use of the drawn article 76. There are typically some voids 72 between the powder particles 26 in the preform 74 at step 56 because the loose powder particles do not pack together with perfect efficiency. These voids are largely closed by consolidation of the powder particles 26 during the wire drawing step 58 so that there are substantially no voids in the final drawn article 76. The substantial absence of voids is desirable, as any voids may interfere with a subsequent welding operation. A minor volume fraction of voids may be present without harming the operability of the final article.

The drawn article 76 may be used in any operable manner. In a typical case, the drawn article is melted to form a melted article. In the preferred application, the drawn article 76 (i.e., final article 20) is used as a weld wire and hence as a weld filler material, step 60. In FIG. 3, the application of a weld overlay 80 on a substrate 82 is illustrated. Heat is locally supplied to the surface of the substrate 82. The article 20/76 is progressively fed into the heated area, and the heat input is selected to be sufficient to melt the article 20/76 to form a molten pool 84. The heat may be supplied by any operable approach, such as an electric arc struck between the article 20/76 and the substrate 82, a separate electric arc, or an energy beam such as a laser beam or an electron beam. The substrate 82 and the article 20/76 are moved relative to each other so that the molten pool solidifies as the weld overlay 80. The net composition of the overlay 80 is that of the article 20/76, a high-gamma-prime nickel-base superalloy in the preferred embodiment. The present approach is also applicable to the use of the weldment to join two separate articles Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article having a net metallic composition and comprising:
    a tubular sheath made of a sheath nickel-base alloy; and
    a core disposed within the tubular sheath and comprising powder particles made of a core nickel-base alloy, wherein the net metallic composition of the article is a nickel-base superalloy that is heat treatable to produce more than about 30 volume percent gamma prime phase.

2. The article of claim 1, wherein the sheath nickel-base alloy has no more than about 4 percent of aluminum by weight.

3. The article of claim 1, wherein the core nickel-base alloy has more than about 4 percent of aluminum by weight.

4. The article of claim 1, wherein
    the sheath nickel-bass alloy has no more than about 4 percent of aluminum by weight, and
    the core nickel-base alloys has more than about 4 percent of aluminum by weight.

5. The article of claim 1, wherein the ratio of a weight of the core nickel-base alloy to a weight of a total of the core nickel-base alloy plus the sheath nickel-base alloy is not greater than about 0.3.

6. The article of claim 1, wherein the sheath nickel-base alloy has from 0 to about 4 percent by weight aluminum, and wherein the core nickel-base alloy has from about 10 to about 15 percent by weight aluminum.

7. The article of claim 1,
    wherein the sheath nickel-base alloy has a composition in weight percent of about 12 percent cobalt, about 1.5 percent molybdenum, about 4 percent tungsten, about 3.5 percent aluminum, about 4 percent tantalumn, about 3.75 percent rhenium, about 8 percent chromium, about 2 percent hafnium, about 0.004 percent boron, about 0.002 percent carbon, balance nickel and minor elements, and
    wherein the core nickel-base alloy has a composition in weight percent of about 12 percent cobalt, 1.5 percent molybdenum, about 7.6 percent tungsten, about 14.2 percent aluminum, about 13.5 percent tantalum, about 8 percent chromium, about 0.04 percent yttrium, about 0.05 percent borou, about 0.41 percent carbon, balance nickel and minor elements.

8. The article of claim 1, wherein the sheath nickel-base alloy has a sheath-nickel-base-alloy liquidus temperature and the core-nickel-base alloy has a core-nickel-base-alloy liquidus temperature, and wherein the sheath-nickel-base-alloy liquidus temperature and the core-nickel-base-alloy liquidus temperature are within about 200° F. of each other.

9. The article of claim 8, wherein
    the sheath nickel-base alloy has no more than about 4 percent of aluminum by weight, and
    the core nickel-base alloy has more than about 4 percent of aluminum by weight.

10. The article of claim 1, wherein the powder particles have substantially no voids there between.

11. The article of claim 1, wherein the sheath nickel-base alloy has a sheath-nickel-base-alloy liquidus temperature and the core-nickel-base alloy has a core-nickel-base-alloy liquidus temperature, and wherein the sheath-nickel-base-alloy liquidus temperature is less than the core-nickel-base-alloy liquidus temperature.

12. The article of claim 1, wherein the core further comprises a nonmetallic particle.

13. The article of claim 1, wherein the sheath nickel-base alloy has no more than about 4 percent of aluminum by weight.

14. An article having a net metallic composition and comprising:
   a tubular sheath made of a nickel-base alloy having about 3% to about 4% by weight of aluminum; and
   a core disposed within the tubular sheath and comprising powder particles made of a core nickel-base alloy, wherein the net metallic composition of the core and the sheath provides a nickel-base superalloy having a composition that includes about 10% to about 15% by weight of aluminum.

15. An article having a net metallic composition that is a high-gamma-prime nickel-base superalloy and comprising:
   a tubular sheath made of a sheath nickel-base alloy having about 3–4 percent of aluminum by weight; and
   a core disposed within the tubular sheath and comprising powder particles made of a core nickel-base alloy having mores than about 4 percent of aluminum by weight, wherein the ratio of a weight of the core nickel-base alloy to a weight of a total of the core nickel-base alloy plus the sheath nickel-base alloy is not greater than about 0.3 and wherein the net metallic composition is a precipitation-hardenable nickel-base superalloy.

16. The article of claim 15, wherein the net metallic composition of the article is a high-gamma-prime nickel-base superalloy.

17. A method of making weld filler metal, comprising the steps of:
   preparing a preform having a net metallic composition and comprising
      a tubular sheath made of a sheath nickel-base alloy, and
      a core disposed within the tubular sheath and comprising consolidated powder particles made of a core nickel-base alloy, wherein the net metallic composition of the weld metal is a precipitation-hardenable nickel-base superalloy; and
   wire drawing the preform to produce a drawn weld filler metal.

18. The method of claim 17, including an additional step, after the step of wire drawing, of utilizing the weld filler metal.

19. The method of claim 17, including an additional step, after the step of wire drawing, of melting the drawn weld filler material to form a melted article.

20. The method of claim 17, including an additional step, after the step of wire drawing, of
   melting the weld filler metal to form a melted article having a net composition that is a high-gamma-prime nickel-base superalloy.

21. A weld filler metal having a net metallic composition and comprising:
   a tubular sheath made of a sheath nickel-base alloy; and
   a core disposed within the tubular sheath and comprising powder particles made of a core nickel-base alloy, wherein the core nickel-base alloy has more than about 4 percent of aluminum by weight wherein the net metallic composition of the weld filler metal is a precipitation-hardenable nickel-base superalloy.

22. The weld filler metal of claim 21, wherein the net metallic composition of the weld filler metal is a nickel-base superalloy that is heat treatable to produce more than about 30 volume percent gamma prime phase.

* * * * *

UNITED STATES PATENT AND TRADEMARK OFFICE
CERTIFICATE OF CORRECTION

PATENT NO.    : 6,750,430 B2
DATED         : June 15, 2004
INVENTOR(S)   : Thomas Joseph Kelly It is certified that error appears in the above-identified patent and that said Letters Patent is hereby corrected as shown below:

Column 2,
Line 38, "core-nickel-base alloy" should be -- core-nickel-base-alloy --.

Signed and Sealed this

Eighth Day of February, 2005

JON W. DUDAS
*Director of the United States Patent and Trademark Office*